United States Patent
Stefan et al.

(10) Patent No.: US 12,172,574 B2
(45) Date of Patent: Dec. 24, 2024

(54) METHOD FOR OPERATING A MOTOR VEHICLE

(71) Applicant: Ford Global Technologies, LLC, Dearborn, MI (US)

(72) Inventors: Frederic Stefan, Aachen (DE); Christoph Arndt Dr habil, Moerlen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 17/822,595

(22) Filed: Aug. 26, 2022

(65) Prior Publication Data

US 2023/0066337 A1    Mar. 2, 2023

(30) Foreign Application Priority Data

Aug. 26, 2021  (DE) .......................... 102021122094.7

(51) Int. Cl.
| | |
|---|---|
| *B60Q 5/00* | (2006.01) |
| *G06F 18/214* | (2023.01) |
| *G06N 3/044* | (2023.01) |
| *G06N 3/08* | (2023.01) |

(52) U.S. Cl.
CPC ........... *B60Q 5/008* (2013.01); *G06F 18/214* (2023.01); *G06N 3/044* (2023.01); *G06N 3/08* (2013.01)

(58) Field of Classification Search
CPC ........... B60Q 5/008; G06N 3/044; G06N 3/08
USPC ................................ 381/86, 94.1, 71.1, 73.1
See application file for complete search history.

(56) References Cited

U.S. PATENT DOCUMENTS

2018/0364966 A1* 12/2018 Valeri ....................... H04S 7/30
2022/0351622 A1* 11/2022 Bush .................... G06Q 20/127

* cited by examiner

*Primary Examiner* — Thjuan K Addy
(74) *Attorney, Agent, or Firm* — Frank Lollo; Eversheds Sutherland (US) LLP

(57) ABSTRACT

A method for operating a motor vehicle having at least one motor-driven electric machine which serves as a traction motor is provided. The method includes the steps of: loading vehicle data of the motor vehicle, which are indicative of a sound emission requirement, feeding a trained artificial neural network with the vehicle data in order to obtain sound emission generator control data, and feeding a sound emission generator of the motor vehicle with the sound emission generator control data.

13 Claims, 3 Drawing Sheets

METHOD FOR OPERATING A MOTOR VEHICLE

CROSS-REFERENCE TO RELATED APPLICATIONS

The applications claims priority to and the benefit of German Application No. 102021122094.7, filed Aug. 26, 2021, which is hereby incorporated by reference herein in its entirety.

FIELD

The invention relates to a method for operating a motor vehicle having at least one motor-driven electric machine which serves as a traction motor.

BACKGROUND

In motor vehicle technology, a powertrain of a motor vehicle is understood to mean all components which generate the power for the drive in the motor vehicle and transfer it to the ground.

A powertrain of this type can have an electric machine which serves as a traction motor when it is motor-driven, and which is used as a generator in order to recover brake energy. A motor vehicle of this type can be designed as an all-electric vehicle (BEV) having only one electric drive, or as a hybrid electric vehicle (HEV) whose powertrain has an internal combustion engine in addition to the electric machine, but which can also be driven purely electrically depending on the situation, i.e. the drive is temporarily provided only by the motor-driven electric machine as the traction motor.

An electric machine of this type inherently produces fewer noise emissions than an internal combustion engine, particularly at low vehicle speeds of less than 30 km/h. However, the noise emissions not only represent noise disturbance, but also perform an audible warning function for an approaching motor vehicle, thereby increasing road traffic safety.

In the case of motor vehicles having at least one motor-driven electric machine which serves as a traction motor, it is possible to control and optimize the noises generated by the motor vehicle in order to increase road traffic safety in this way by means of a minimum amount of noise emissions.

The legislative authority therefore stipulates the implementation of an artificial sound emission generator in order to simplify the audible perception of motor vehicles of this type in public road traffic.

Sound emission generators of this type are known from U.S. Pat. No. 10,997,962 B2, CN 110341591 A, U.S. Pat. No. 8,031,085 B1, CN 112652315 A and U.S. Pat. No. 8,362,921 B2. However, these devices generate sound emissions even if this is not necessary, thereby increasing noise disturbance.

A need therefore exists to find ways to remedy this.

SUMMARY

An object of the invention is achieved by a method for operating a motor vehicle having at least one motor-driven electric machine which serves as a traction motor, having the steps of:
loading vehicle data of the motor vehicle which are indicative of a sound emission requirement,
feeding a trained artificial neural network with the vehicle data in order to obtain sound emission generator control data, and
feeding a sound emission generator of the motor vehicle with the sound emission generator control data.

Artificial neural networks, ANN for short, are networks consisting of artificial neurons. These neurons (also referred to as node points) of an artificial neural network are arranged in layers and are normally interconnected in a fixed hierarchy. The neurons are usually connected between two layers, but in rarer cases within a layer also.

An artificial neural network of this type is trained during a training phase prior to its commissioning. The artificial neural network is modified during the training phase so that it generates associated output patterns for specific input patterns. This can be done by means of monitored learning, unmonitored learning, reinforcement learning or stochastic learning.

By using an artificial neural network pre-trained during a training phase, the sound emission generator can be controlled specifically to generate sound emissions adapted according to a situation. Unnecessary sound emissions which would constitute noise disturbance are thus avoided.

According to one embodiment, the untrained artificial neural network is trained in a further step with training data which have been obtained by means of measurements and/or simulations. To do this, fleets of motor vehicles can be used whose vehicle data and also measurement data from measuring stations are indicative of a noise level and/or traffic volume and which are transmitted wirelessly to a cloud in which the artificial neural network can also be trained. The data obtained by means of measurements can also be used, for example, to generate further data by means of suitable simulations in order to increase the quantity of training data in this way.

According to a further embodiment, the vehicle data are position data indicative of the current position of the motor vehicle and/or operating data of an energy management module of the motor vehicle and/or noise data of a noise determination module of the motor vehicle and/or noise data of a noise requirement determination module of the motor vehicle. The position data can be determined with a navigation system of the motor vehicle and make it possible to establish whether the motor vehicle is located e.g. in an urban area, on a highway or on a country road. The operating data of an energy management module of the motor vehicle can be data e.g. of a battery management system (BMS) containing information relating to a state of charge of a traction battery of the motor vehicle. The noise data of a noise determination module of the motor vehicle describe the current noise level in the environment of the motor vehicle and, where appropriate, e.g. the variation over time and/or the frequency spectrum of the noise in the environment of the motor vehicle. The noise data depend e.g. on the traffic density and the type of road users (passenger vehicles, trucks, buses, cyclists, etc.). The noise data of a noise requirement determination module of the motor vehicle are indicative of the necessary sound emissions which are required in order to guarantee an adequate audible perception of the motor vehicle at the current noise level.

According to a further embodiment, a recurrent neural network is used as the artificial neural network. Recurrent neural networks (RNN) refer to artificial neural networks which, in contrast to feedforward neural networks, are characterized by connections of neurons of one layer to neurons of the same layer or of a preceding layer. Data in the form of sequences, such as e.g. noise sequences, can be processed particularly well with recurrent neural networks of this type.

According to a further embodiment, the artificial neural network has a long short-term memory (LSTM). A long short-term memory of this type improves the training results achieved during the training phase.

According to a further embodiment, the artificial neural network is designed for dropout. Dropout is understood to mean a regularization method which is used in artificial neural networks and reduces the risk of overfitting. To do this, a predetermined number, e.g. 30%, of the neurons are deactivated in each layer of the artificial neural network ("dropout") and are taken into account for the ensuing calculation step. This constitutes a highly effective method for training deep neural networks.

The invention further relates to a computer program product, designed to carry out a method of this type, a system and a motor vehicle for a system of this type. The methods, steps, functions described herein can be performed by a computer, such as a controller, which may include one or more processors and memory.

BRIEF DESCRIPTION OF THE DRAWINGS

The invention will now be explained with reference to a drawing. In the drawing.

DETAILED DESCRIPTION

Figure 1:
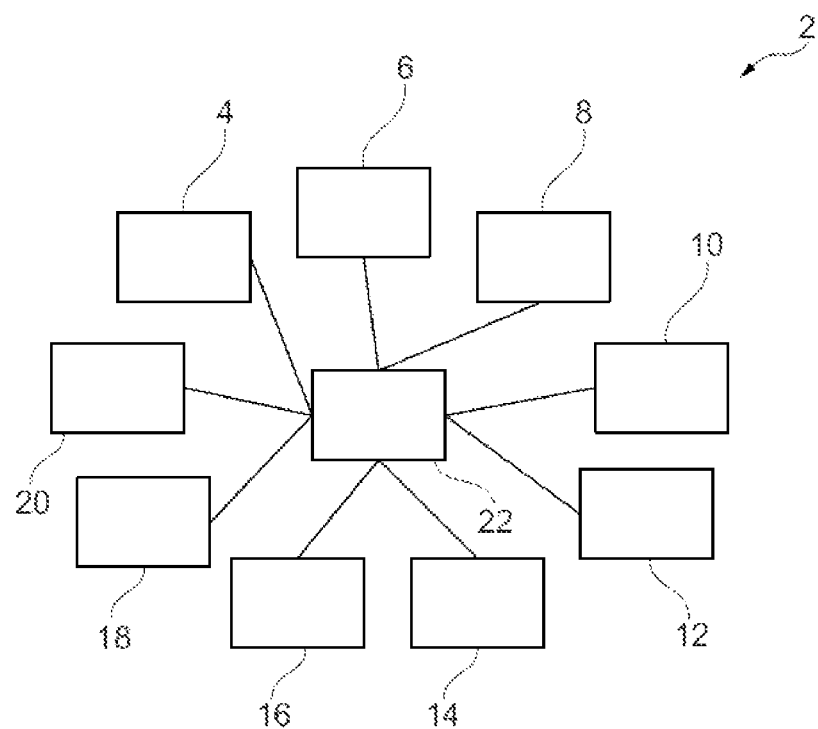
FIG. 1 shows a schematic view of components of a system for operating a motor vehicle.

Reference is first made to FIG. 1.

The system 2 has, as components, a motor vehicle 4 or a mobility platform which has a data exchange connection to the system 2.

The motor vehicle 4 has a powertrain having at least one motor-driven electric machine 6 which serves at least temporarily as a traction motor. A motor vehicle 4 of this type can be e.g. an all-electric vehicle (BEV) having only one electric drive, or a hybrid electric vehicle (HEV).

A sound emission generator 8 of the motor vehicle 4 is designed to generate desired sound emissions according to predefined features (intensity, frequency, pattern, etc.).

If the vehicle 4 is designed as a hybrid electric vehicle (HEV), the powertrain of the motor vehicle 4 also has an internal combustion engine 10 in addition to the electric machine 6.

An energy management module 12 of the motor vehicle 4 is designed to monitor at least the electric energy state in the motor vehicle 4, such as e.g. a state of charge of a traction battery, and to exchange data with other components of the system 2.

A position determination module 14 of the motor vehicle 4 is a navigation system such as e.g. GPS which enables the current position of the motor vehicle 4 to be determined.

A noise determination module 16 of the motor vehicle 4 is designed to perform an estimation of a noise level or an acoustic load in a predetermined geographical area with predetermined dimensions (e.g. a circle with a radius of 1 km). All traffic-related sound sources are evaluated for this purpose.

The geographical area is centered on the motor vehicle 4 and can also have different shapes and dimensions. The motor vehicle 4 can have its own microphones and/or can have a data transmission connection to measuring stations with microphones at the roadside. The data of the measuring stations can also be transmitted to a cloud where they are further processed as described below. Furthermore, the number of road users in the geographical area, their type (passenger vehicle, truck, bus, cyclist, etc.) and/or their speed can also be evaluated.

The noise requirement determination module 18 of the motor vehicle 4 is designed to estimate the sound emission requirement in order to guarantee an adequate audible perceptibility of the motor vehicle 4 in the predetermined geographical area. The noise requirement determination module 18 can be assigned to the motor vehicle 4 or can be provided in a cloud. The noise requirement determination module 18 can further have a prediction model (e.g. with a classification algorithm) which is based on specific parameters of the motor vehicle 4, such as e.g. its speed and/or its vehicle type or its class and/or its drive type and/or the status of the sound emission generator 8.

An interface module 20 of the system 2 is designed in such a way that the motor vehicle 4 can exchange data with the components of the system 2 and also with other components outside the motor vehicle 4. The interface module 20 can further be designed e.g. for C2I (car-to-infrastructure) communication.

A control module 22 of the system 2 is designed to control the different operating modes of the system 2, such as e.g. a training phase or a normal operational phase, to guarantee the data exchange between the components of the system 2.

The system 2 and the components of the system 2 described above and below can have correspondingly designed hardware and/or software components for these tasks and/or functions and for the tasks and/or functions described below.

Figure 2:
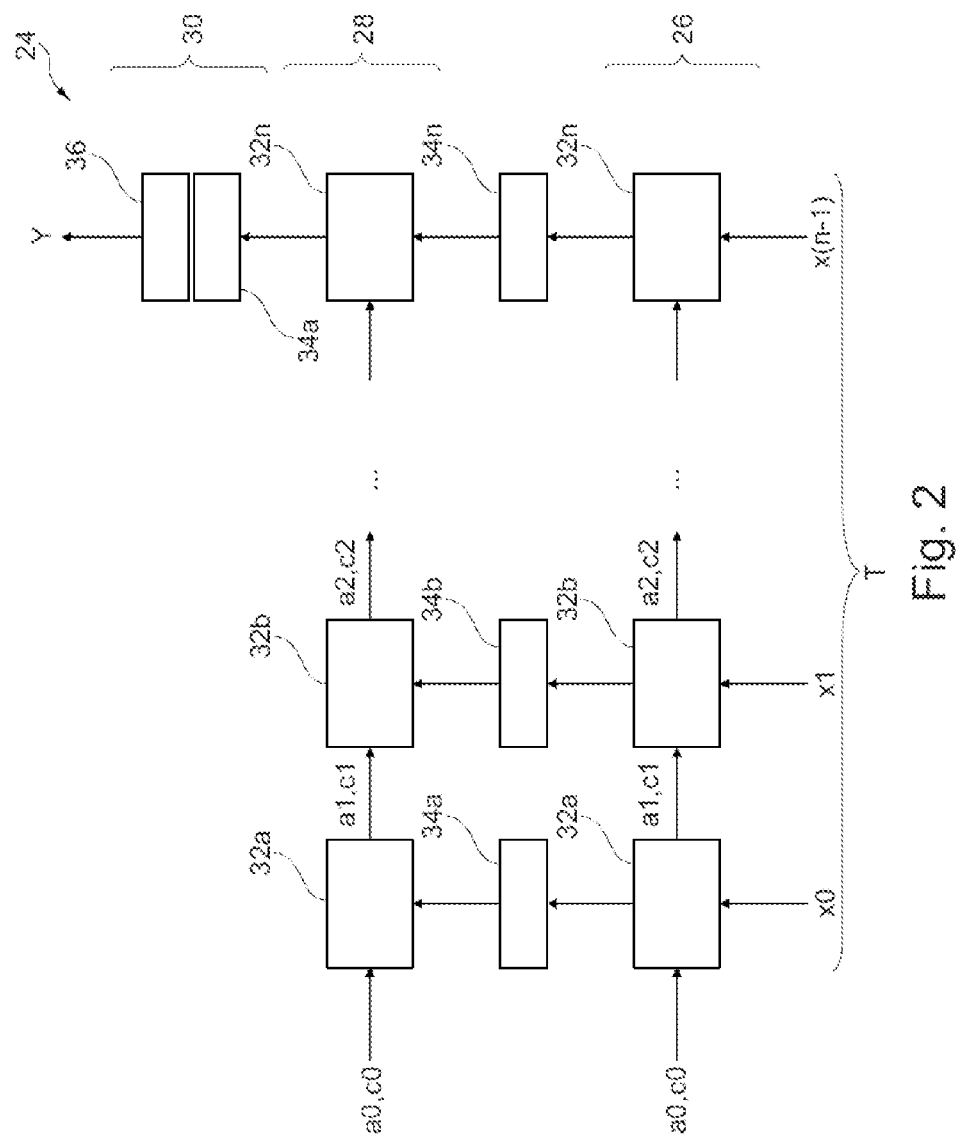
FIG. 2 shows a schematic view of details of an artificial neural network of the system shown in FIG. 1.

Reference is now additionally made to FIG. 2.

An artificial neural network 24 is shown as a further component of the system 2.

In the present exemplary embodiment, the artificial neural network 24 is a recurrent neural network. In the present exemplary embodiment, the artificial neural network 24 is designed as a unidirectional network. In contrast to the present exemplary embodiment, the artificial neural network 24 can also be designed as a bidirectional network.

In the present exemplary embodiment, the artificial neural network 24 is further designed as a multi-layer neural network, i.e., along with an input layer 26 and an output layer 30, it has at least one further intermediate layer 28 with artificial neurons.

In the present exemplary embodiment, the input layer 26 and the at least one shown intermediate layer 28 in each case have a plurality of artificial neurons. In contrast, in the present exemplary embodiment, the output layer 36 has only one dropout unit 34a to which a softmax unit 36 providing a softmax function is connected downstream. In the present exemplary embodiment, the artificial neural network 24 thus has a many-to-one architecture, i.e. it has a plurality of inputs, but only one single output.

In the present exemplary embodiment, a long short-term memory (LSTM) in the form of LSTM units 32a, 32b, 32n is assigned in each case to the artificial neurons of the input layer 26 and the intermediate layer 28.

In the present exemplary embodiment, the artificial neural network 24 is further designed for dropout. Dropout units 32a, 34b, 34n are provided for this purpose between the input layer 26 and the at least one shown intermediate layer 28.

The artificial neural network 24 is fed with training data TD during a training phase prior to its commissioning. The artificial neural network 24 is trained e.g. by means of the back-propagation of error method by modifying weighting factors or training parameters of the artificial neurons of the artificial neural network 24 in order to achieve the most reliable possible mapping of given input vectors onto given output vectors.

Here, a0, c0; a1, c1; a2, c2; . . . an, cn are training parameters to be optimized during the training phase, whereas x0, x1, x(n−1) are feature vectors which are assigned to respective sampling times, e.g. every 100 ms, over a time period T, e.g. 1 s, and which represent input parameters. Y is the output parameter of the system 2 can be a vector or a scalar which corresponds to a control value of the sound emission generator control data GA. The control value can be a binary value, wherein e.g. no artificial generation of sound is assigned to the value logical zero and an artificial generation of sound is assigned to the value logical one. However, the control value can also be a continuous scalar value in order to predefine the intensity of the generated sound.

The training data TD for the training phase contain data pairs consisting of the input-side feature vectors x0, x1, x(n−1) and the output Y. The training data TD can be labelled data, whereas the vehicle data FD with which the trained artificial neural network 24 is then fed later during normal operation comprise only the input-side feature vectors x0, x1, x(n−1).

Figure 3:
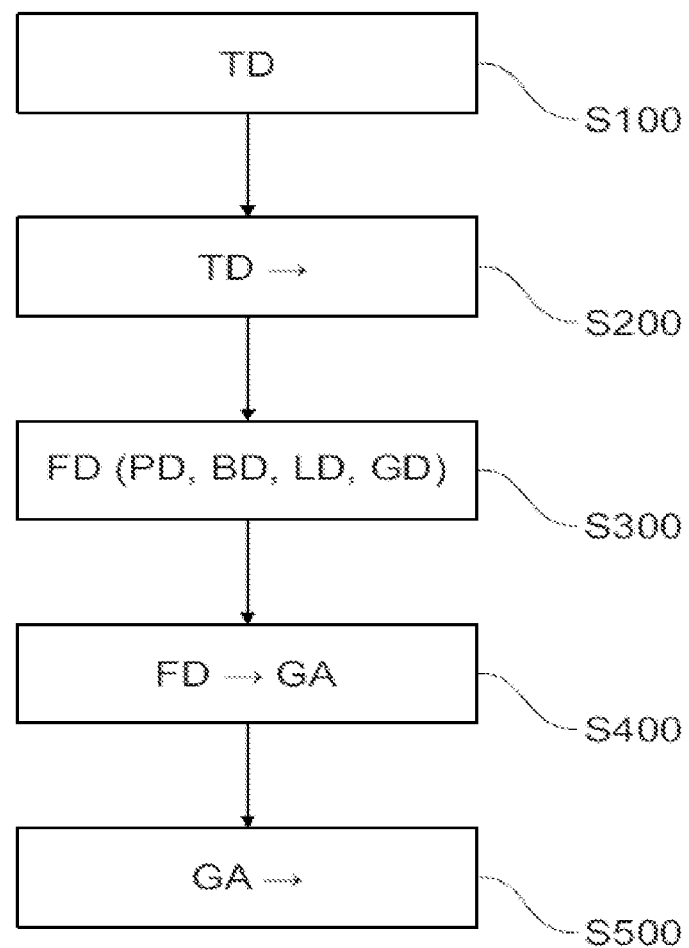
FIG. 3 shows a schematic view of a method sequence for operating the system shown in FIG. 1.

Reference will now be made additionally to FIG. 3 in order to explain a method sequence for operating the system 2 shown in FIG. 1.

After the training data TD have been collected or generated and labelled in a first step S100, they are used in a further step S200 of a training phase in order to train the still untrained artificial neural network 24 with training data TD using dropout.

In a further step S300 of a normal operational phase, the system 2 is then activated e.g. automatically during each commissioning of the motor vehicle 4 and depending on its detected current position, and the current vehicle data FD of the motor vehicle 4 which are indicative of a sound emission requirement are loaded.

The vehicle data FD contain the position data PD of the position determination module 14 and/or the operating data BD of the energy management module 12 and/or noise data LD of the noise determination module 16 and/or noise data GD of the noise requirement determination module 18 of the motor vehicle 4.

In a further step S400, the trained artificial neural network 24 is fed with the vehicle data FD in order to obtain the sound emission generator control data GA.

In a further step S500, the sound emission generator 6 of the motor vehicle 4 is fed with the sound emission generator control data GA.

In contrast to the present exemplary embodiment, the sequence of the steps can also be different. A plurality of steps can furthermore also be carried out concurrently or simultaneously. Furthermore, also in contrast to the present exemplary embodiment, individual steps can be skipped or omitted.

By using an artificial neural network 24 pre-trained during a training phase, the sound emission generator 8 of the motor vehicle 4 can thus be controlled specifically to generate sound emissions adapted according to a situation. Unnecessary sound emissions which would constitute noise disturbance are thus avoided.

LIST OF REFERENCE SYMBOLS

2 System
4 Motor vehicle
6 Electric machine
8 Sound emission generator
10 Internal combustion engine
12 Energy management module
14 Position determination module
16 Noise determination module
18 Noise requirement determination module
20 Interface module
22 Control module
24 Artificial neural network
26 Input layer
28 Intermediate layer
30 Output layer
32a LSTM unit
32b LSTM unit
32n LSTM unit
34a Dropout unit
34b Dropout unit
34n Dropout unit
36 Softmax unit
a0 Training parameter
a1 Training parameter
a2 Training parameter
an Training parameter
c0 Training parameter
c1 Training parameter
c2 Training parameter
cn Training parameter
x0 Feature vector
x1 Feature vector
x(n−1) Feature vector
FD Vehicle data
GA Sound emission generator control data
GD Noise data
LD Noise data
PD Position data
T Time period
Y Output parameter
S100 Step
S200 Step
S300 Step
S400 Step
S500 Step

The invention claimed is:

1. Method for operating a motor vehicle having at least one motor-driven electric machine which serves as a traction motor, having the steps of:
    loading vehicle data of the motor vehicle which are indicative of a sound emission requirement,
    feeding a trained artificial neural network with the vehicle data in order to obtain sound emission generator control data,
    feeding a sound emission generator of the motor vehicle with the sound emission generator control data,
    generating, by the sound emission generator, audible noise based on the sound emission generator control data; and
    outputting, by the motor vehicle, the audible noise to an external environment of the vehicle.

2. Method according to claim 1, wherein the untrained artificial neural network is trained in a further step with training data which have been obtained by means of measurements and/or simulations.

3. Method according to claim 1, wherein the vehicle data are position data indicative of the current position of the motor vehicle and/or operating data of an energy management module of the motor vehicle and/or noise data of a noise determination module of the motor vehicle and/or noise data of a noise requirement determination module of the motor vehicle.

4. Method according to claim 1, wherein a recurrent neural network is used as the artificial neural network.

5. Method according to claim 1, wherein the artificial neural network has a long short-term memory.

6. Method according to claim 1, wherein the artificial neural network is designed for dropout.

7. Computer program product, designed to carry out a method according to one of claim 1.

8. System for operating a motor vehicle, comprising:
at least one motor-driven electric machine which serves as a traction motor, wherein the system is designed to load vehicle data of the motor vehicle which are indicative of a sound emission requirement, to feed a trained artificial neural network with the vehicle data in order to obtain sound emission generator control data, to feed a sound emission generator of the motor vehicle with the sound emission generator control data, to generate audible noise based on the sound emission generator control data, and to output the audible noise into an external environment of the motor vehicle.

9. System according to claim 8, wherein the system is designed to train the untrained artificial neural network with training data which have been obtained by means of measurements and/or simulations.

10. System according to claim 8, wherein the vehicle data are position data indicative of the current position of the motor vehicle and/or operating data of an energy management module of the motor vehicle and/or noise data of a noise determination module of the motor vehicle and/or noise data of a noise requirement determination module of the motor vehicle.

11. System according to claim 8, wherein the artificial neural network is a recurrent neural network.

12. System according to claim 8, wherein the artificial neural network has a long short-term memory.

13. System according to claim 8, wherein the artificial neural network is designed for dropout.

* * * * *